(12) United States Patent
Watanabe et al.

(10) Patent No.: US 11,885,764 B2
(45) Date of Patent: Jan. 30, 2024

(54) GAS SENSOR

(71) Applicant: NGK INSULATORS, LTD., Nagoya (JP)

(72) Inventors: Yusuke Watanabe, Nagoya (JP); Tetsuya Ishikawa, Kronberg im Taunus (DE)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 17/353,870

(22) Filed: Jun. 22, 2021

(65) Prior Publication Data

US 2021/0310982 A1    Oct. 7, 2021

Related U.S. Application Data

(62) Division of application No. 15/938,126, filed on Mar. 28, 2018, now abandoned.

(30) Foreign Application Priority Data

Mar. 31, 2017   (JP) .................................. 2017-070703

(51) Int. Cl.
   *G01N 27/407*   (2006.01)
   *G01N 27/419*   (2006.01)
   *G01N 27/41*    (2006.01)

(52) U.S. Cl.
   CPC ..... *G01N 27/4071* (2013.01); *G01N 27/4072* (2013.01); *G01N 27/41* (2013.01); *G01N 27/419* (2013.01)

(58) Field of Classification Search
   CPC ............ G01N 27/4071; G01N 27/419; G01N 27/406; G01N 27/4062; G01N 27/4065; G01N 27/407–4078
   See application file for complete search history.

(56) References Cited

U.S. PATENT DOCUMENTS 4,655,901 A    4/1987 Mase
4,824,548 A    4/1989 Iino et al.
(Continued)

FOREIGN PATENT DOCUMENTS

JP    07-159374    6/1995
JP    2014-190940    10/2014
(Continued)

OTHER PUBLICATIONS

Chinese Office Action dated Oct. 26, 2021, issued in corresponding CN Patent Application No. 201810268623.5.
(Continued)

*Primary Examiner* — Joshua L Allen
*Assistant Examiner* — Vivian A Tran
(74) *Attorney, Agent, or Firm* — MATTINGLY & MALUR, PC (57) ABSTRACT

A gas sensor according to the present application includes a detecting device that detects a specific gas concentration of a measurement-object gas based on an electromotive force generated between a reference electrode and a measurement electrode; and a reference gas regulating device that flows an oxygen pumping current between the reference electrode and a measurement-object gas side electrode and pumps oxygen from around the measurement-object gas side electrode to around the reference electrode, wherein when the average value of the oxygen pumping current is P and the limiting current value of a reference gas introduction layer when oxygen is pumped from around the reference electrode to around the measurement-object gas side electrode is Q, the ratio Q/P is from 0.8 to 10.

4 Claims, 3 Drawing Sheets

(56) References Cited

U.S. PATENT DOCUMENTS

| | | |
|---|---|---|
| 4,909,922 A | 3/1990 | Kato |
| 4,943,330 A | 7/1990 | Iino et al. |
| 5,496,461 A * | 3/1996 | Hotzel ............... G01N 27/419 204/426 |
| 2004/0089544 A1* | 5/2004 | Kato ................... G01N 27/419 204/406 |
| 2005/0029127 A1* | 2/2005 | Reischl ............... G01N 27/419 205/781 |
| 2009/0120791 A1 | 5/2009 | Miyashita |
| 2009/0242404 A1 | 10/2009 | Miyashita |
| 2011/0056270 A1 | 3/2011 | Reinhardt |
| 2014/0102170 A1 | 4/2014 | Kato |
| 2015/0276659 A1* | 10/2015 | Sekiya ............... G01N 27/409 204/416 |
| 2016/0327512 A1 | 11/2016 | Reinhardt |
| 2017/0003249 A1 | 1/2017 | Reinhardt |
| 2017/0108463 A1 | 4/2017 | Kajiyama et al. |
| 2018/0284052 A1 | 10/2018 | Watanabe |
| 2018/0284056 A1 | 10/2018 | Watanabe |
| 2018/0284057 A1 | 10/2018 | Watanabe |
| 2018/0284058 A1 | 10/2018 | Watanabe |

FOREIGN PATENT DOCUMENTS

| | | |
|---|---|---|
| JP | 2015-200643 | 11/2015 |
| WO | 2013/005491 | 1/2013 |
| WO | 2016/002793 A1 | 1/2016 |

OTHER PUBLICATIONS

Notice of Reasons for Refusal dated Sep. 1, 2020, issued in corresponding Japanese Patent Application No. 2017-070703.

* cited by examiner

GAS SENSOR

BACKGROUND OF THE INVENTION

1. Field of the Invention

The present invention relates to a gas sensor.

2. Description of the Related Art

Conventionally, a gas sensor that detects the concentration of a specific gas such as NOx in a measurement-object gas such as an exhaust gas of an automobile is known. For example, Patent Literature 1 discloses a gas sensor including a laminate in which a plurality of oxygen ion conductive solid electrolyte layers are laminated, a reference electrode formed in the laminate and into which a reference gas (for example, atmosphere) is introduced from a reference gas introduction space, a measurement electrode disposed in a measurement-object gas flowing portion in the laminate, and a measurement-object gas side electrode disposed in a portion of the laminate that is exposed to the measurement-object gas. This gas sensor detects the specific gas concentration in the measurement-object gas based on the electromotive force generated between the reference electrode and the measurement electrode. This gas sensor is provided with a reference gas regulating device that flows a control current between the reference electrode and the measurement-object gas side electrode and pumps oxygen to around the reference electrode. In Patent Literature 1, there is described that since this reference gas regulating device pumps oxygen to around the reference electrode, a decrease in oxygen concentration can be compensated for when the oxygen concentration of the reference gas around the reference electrode temporarily decreases, and the deterioration in detection accuracy of the specific gas concentration is suppressed. The case where the oxygen concentration of the reference gas around the reference electrode decreases is, for example, a case where the measurement-object gas slightly enters the reference gas introduction space.

CITATION LIST

Patent Literature

PTL 1: Japanese Unexamined Patent Application Publication No. 2015-200643

SUMMARY OF THE INVENTION

However, when oxygen around the measurement-object gas side electrode is pumped to around the reference electrode, the detection accuracy of the specific gas is lowered even if the amount of oxygen pumped in is too large or too small, but measures to maintain high detection accuracy have not been adequately studied.

The present invention has been made in view of the above-described problem, and its main object is to maintain high detection accuracy of the specific gas concentration.

The present invention adopts the following measures in order to achieve the above-mentioned main object.

A gas sensor according to the present application comprises a laminate having a plurality of laminated oxygen ion conductive solid electrolyte layers and having therein a measurement-object gas flowing portion for introducing and flowing a measurement-object gas;

a measurement electrode disposed on the inner peripheral surface of the measurement-object gas flowing portion;

a measurement-object gas side electrode disposed in a portion of the laminate that is exposed to the measurement-object gas;

a reference electrode disposed in the laminate;

a porous reference gas introduction layer for introducing a reference gas as a reference for detecting a specific gas concentration of the measurement-object gas and allowing the reference gas to flow to the reference electrode;

a detecting device that detects the specific gas concentration of the measurement-object gas based on an electromotive force generated between the reference electrode and the measurement electrode; and a reference gas regulating device that flows an oxygen pumping current between the reference electrode and the measurement-object gas side electrode and pumps oxygen from around the measurement-object gas side electrode to around the reference electrode, wherein when the average value of the oxygen pumping current is P and the limiting current value of the reference gas introduction layer when oxygen is pumped from around the reference electrode to around the measurement-object gas side electrode is Q, the ratio Q/P is from 0.8 to 10.

In this gas sensor, oxygen is pumped to around the reference electrode by flowing oxygen pumping current between the reference electrode and the measurement-object gas side electrode. This makes it possible to compensate for a decrease in the oxygen concentration around the reference electrode, for example, when the measurement-object gas enters the reference gas introduction layer. The ratio Q/P of the limiting current value Q of the reference gas introduction layer to the average value P of the oxygen pumping current is from 0.8 to 10. Here, the average value P of the oxygen pumping current has a correlation with the amount of oxygen pumped from around the measurement-object gas side electrode to around the reference electrode. The limiting current value Q of the reference gas introduction layer correlates with the diffusion resistance of the reference gas introduction layer. By setting the ratio Q/P of both to from 0.8 to 10, the oxygen concentration around the reference electrode can be maintained at an appropriate value, and therefore the detection accuracy of the specific gas concentration can be kept high.

In the gas sensor of the present invention, the average value P of the oxygen pumping current is preferably from 1 to 30 µA. When the average value P is within this range, detection accuracy of the specific gas concentration can be easily kept high, which is preferable.

In the gas sensor of the present invention, the limiting current value Q of the reference gas introduction layer is preferably from 5 to 30 µA. When the limiting current value Q is within this range, detection accuracy of the specific gas concentration can be kept high, which is preferable.

In the gas sensor of the present invention, the reference gas introduction layer may be provided from a rear end portion of the laminate on the side opposite to a front end portion where the entrance of the measurement-object gas flowing portion is provided to a position beyond the reference electrode. In this case, poisoning substances (contaminants) less easily enter the reference gas introducing layer as compared with a case where a cavity is provided inwardly from the rear end portion of the laminate and the reference gas introducing layer is provided so as to be largely exposed in the cavity.

In the gas sensor of the present invention, the reference gas regulating device may flow a current that is turned on and off at a predetermined period as the oxygen pumping current, between the reference electrode and the measured gas side electrode and may pump oxygen to around the reference electrode, and the detecting device may detect the specific gas concentration in the measurement-object gas in a period in which the oxygen pumping current is off. By doing so, since the oxygen pumping current is turned off when detecting the concentration of the specific gas in the measurement, it is possible to suppress the detection accuracy of the specific gas concentration from being lowered by the oxygen pumping current.

DETAILED DESCRIPTION OF THE INVENTION

Figure 1:
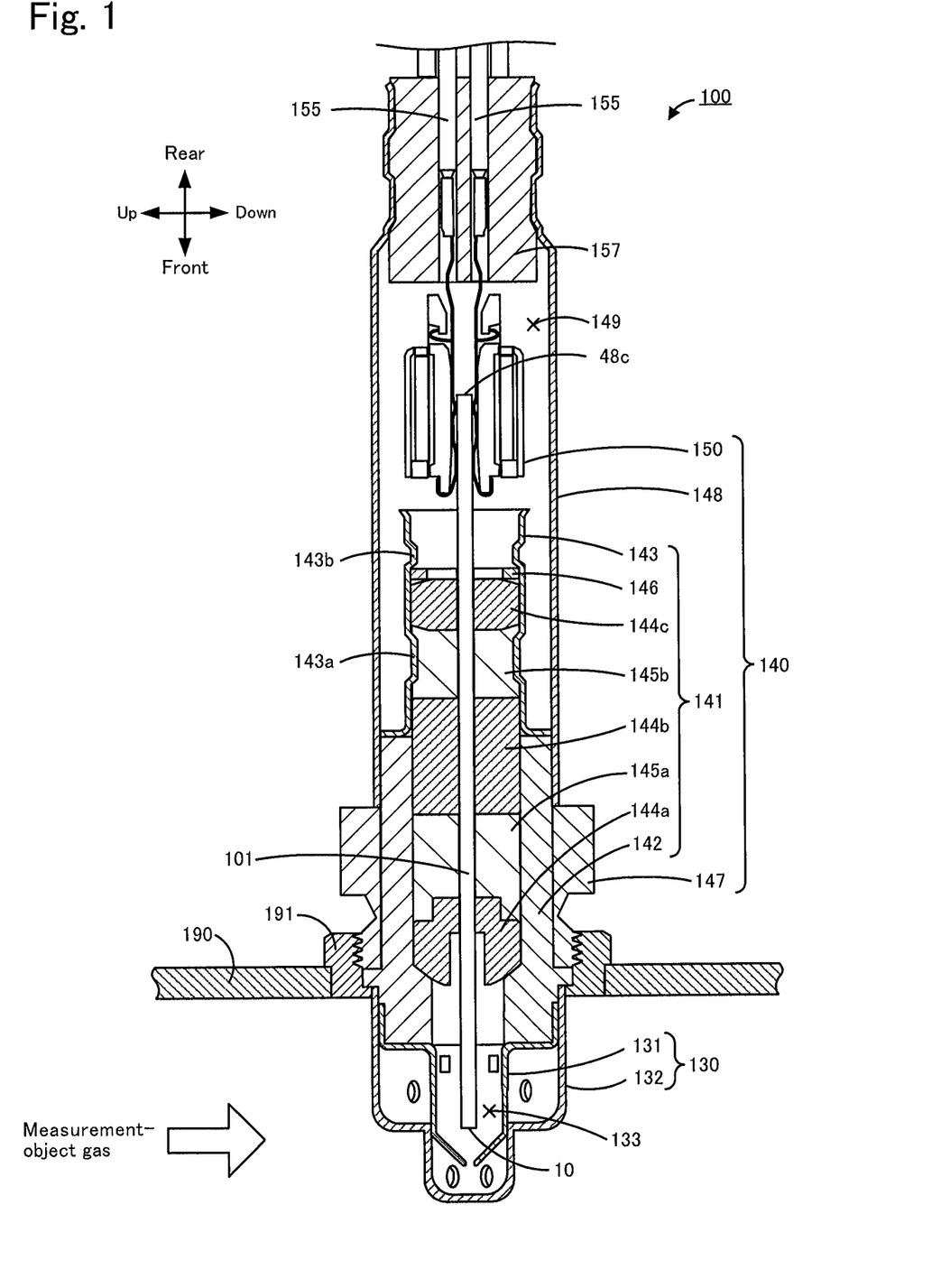
FIG. 1 is a longitudinal sectional view of a gas sensor 100.
Figure 2:
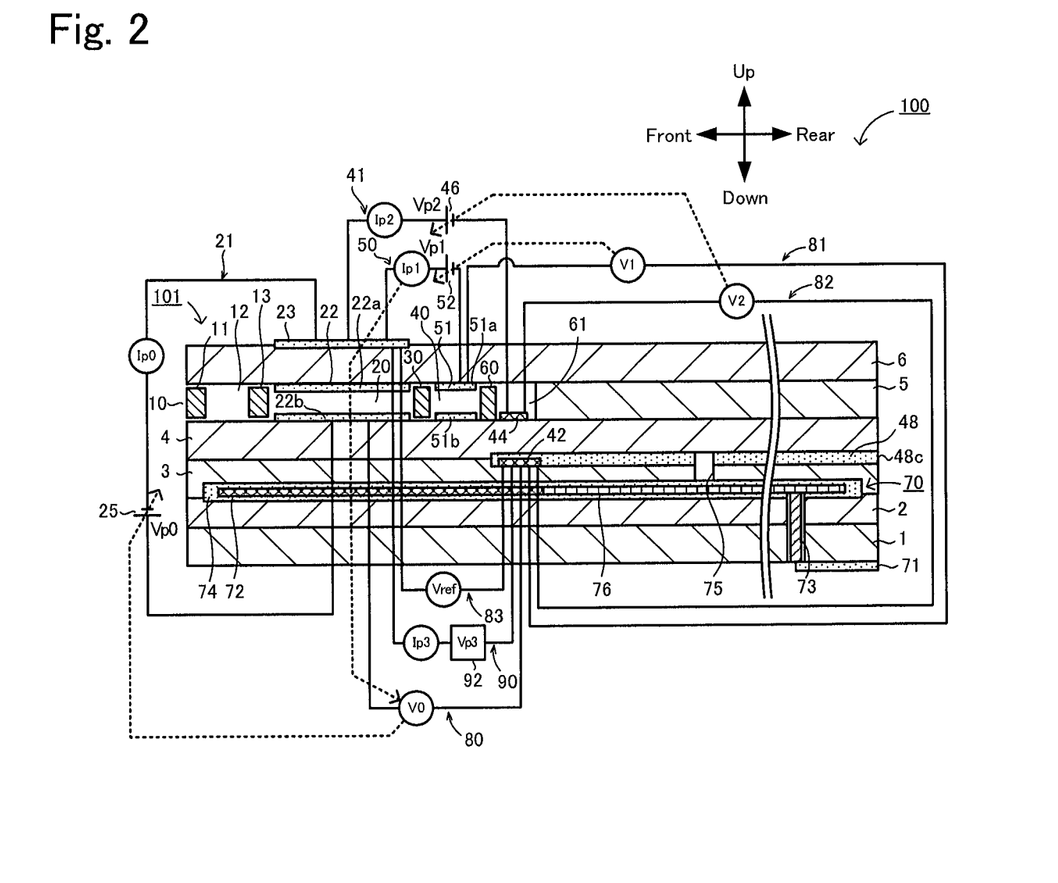
FIG. 2 is a schematic sectional view schematically showing an example of the configuration of a sensor element 101.

Next, an embodiment of the present invention will be described with reference to the drawings. FIG. 1 is a longitudinal sectional view of a gas sensor 100 according to an embodiment of the present invention. FIG. 2 is a schematic sectional view schematically showing an example of a configuration of a sensor element 101 included in the gas sensor 100. The sensor element 101 has a long rectangular parallelepiped shape, the longitudinal direction (left-right direction in FIG. 2) of the sensor element 101 is referred to as the front-rear direction, and the thickness direction (vertical direction in FIG. 2) of the sensor element 101 is referred to as the vertical direction. The width direction (direction perpendicular to the front-rear direction and the vertical direction) of the sensor element 101 is referred to as the left-right direction. The structure of the gas sensor shown in FIG. 1 is known and is described, for example, in International Publication No. WO 2013/005491.

As shown in FIG. 1, the gas sensor 100 includes a sensor element 101, a protective cover 130 that protects the front end side of the sensor element 101, and a sensor assembly 140 including a connector 150 that has continuity with the sensor element 101. As shown in the figure, the gas sensor 100 is attached to a pipe 190 such as an exhaust gas pipe of a vehicle and is used for measuring the concentration of a specific gas such as NOx or $O_2$ contained in an exhaust gas as a measurement-object gas. In this embodiment, the gas sensor 100 measures the NOx concentration as the specific gas concentration.

The protective cover 130 includes a bottomed tubular inner protective cover 131 covering the front end of the sensor element 101, and a bottomed tubular outer protective cover 132 covering the inner protective cover 131. The inner protective cover 131 and the outer protective cover 132 have a plurality of holes for flowing the measurement-object gas into the protective cover 130. A sensor element chamber 133 is formed as a space surrounded by the inner protective cover 131, and the front end of the sensor element 101 is disposed in the sensor element chamber 133.

The sensor assembly 140 includes an element sealing body 141 that seals and fixes the sensor element 101, a nut 147 attached to the element sealing body 141, an outer tube 148, and a connector 150 in contact with and electrically connected to connector electrodes (not shown) (only a heater connector electrode 71 described later is shown in FIG. 2) formed on surfaces (upper and lower surfaces) at the rear end of the sensor element 101.

The element sealing body 141 includes a tubular main fitting 142, a tubular inner tube 143 coaxially welded and fixed to the main fitting 142, and ceramic supporters 144a to 144c, green compacts 145a and 145b, and a metal ring 146 sealed in through holes inside the main fitting 142 and the inner tube 143. The sensor element 101 is located on the central axis of the element sealing body 141 and passes through the element sealing body 141 in the front-rear direction. The inner tube 143 has a reduced diameter portion 143a for pressing the green compact 145b in the direction of the central axis of the inner tube 143, and a reduced diameter portion 143b for pressing forward the ceramic supporters 144a to 144c and the green compacts 145a and 145b via the metal ring 146. By the pressing force from the reduced diameter portions 143a and 143b, the green compacts 145a and 145b are compressed between the main fitting 142 and the inner tube 143 and the sensor element 101. The green compacts 145a and 145b thereby seal the sensor element chamber 133 in the protective cover 130 from a space 149 in the outer tube 148, and fixes the sensor element 101.

The nut 147 is coaxially fixed to the main fitting 142 and has a male threaded portion formed on the outer peripheral surface thereof. The male threaded portion of the nut 147 is inserted into a fixing member 191 that is welded to the pipe 190 and has a female threaded portion in the inner peripheral surface thereof. The gas sensor 100 is thereby fixed to the pipe 190 in a state in which the front end of the sensor element 101 and the portion of the protective cover 130 of the gas sensor 100 protrude into the pipe 190.

The outer tube 148 covers the peripheries of the inner tube 143, the sensor element 101, and the connector 150, and a plurality of lead wires 155 connected to the connector 150 are led out from the rear end to the outside. The lead wires 155 are electrically connected to respective electrodes (described later) of the sensor element 101 via the connector 150. A gap between the outer tube 148 and the lead wires 155 is sealed by a rubber plug 157. The space 149 in the outer tube 148 is filled with a reference gas (atmosphere in this embodiment). The rear end of the sensor element 101 is disposed in this space 149.

As shown in FIG. 2, the sensor element 101 is an element having a laminate in which six layers: a first substrate layer 1, an second substrate layer 2, a third substrate layer 3, a first solid electrolyte layer 4, a spacer layer 5, and a second solid electrolyte layer 6 each of which is an oxygen ion conductive solid electrolyte layer such as zirconia ($ZrO_2$) are laminated in this order from the lower side in the drawing. The solid electrolyte forming these six layers is dense and gastight. The sensor element 101 is manufactured, for example, by subjecting ceramic green sheets corresponding to the respective layers to predetermined processing and printing of a circuit pattern, laminating them, and then firing and integrating them.

At one end (left end in FIG. 2) of the sensor element 101 and between the lower surface of the second solid electrolyte layer 6 and the upper surface of the first solid electrolyte layer 4, a gas inlet 10, a first diffusion rate-determining portion 11, a buffer space 12, a second diffusion rate-determining portion 13, a first internal space 20, a third diffusion rate-determining portion 30, a second internal space 40, a fourth diffusion rate-determining portion 60, and a third internal space 61 are adjacently formed so as to communicate in this order.

The gas inlet 10, the buffer space 12, the first internal space 20, the second internal space 40, and the third internal space 61 are spaces in the sensor element 101 that are provided so as to hollow out the spacer layer 5, the upper parts of which are defined by the lower surface of the second solid electrolyte layer 6, the lower parts of which are defined by the upper surface of the first solid electrolyte layer 4, and the side parts of which are defined by the side surface of the spacer layer 5.

The first diffusion rate-determining portion 11, the second diffusion rate-determining portion 13, and the third diffusion rate-determining portion 30 are each provided as two horizontally long slits (whose openings have a longitudinal direction in a direction perpendicular to the drawing). The fourth diffusion rate-determining portion 60 is provided as one horizontally long slit (whose opening has a longitudinal direction in a direction perpendicular to the drawing) formed as clearance from the lower surface of the second solid electrolyte layer 6. A portion from the gas inlet 10 to the third internal space 61 is also referred to as a measurement-object gas flowing portion.

An atmosphere introduction layer 48 is provided between the upper surface of the third substrate layer 3 and the lower surface of the first solid electrolyte layer 4. The atmosphere introduction layer 48 is a porous body made of ceramics such as alumina. The rear end face of the atmosphere introduction layer 48 is an entrance portion 48c, and the entrance portion 48c is exposed on the rear end face of the sensor element 101. The entrance portion 48c is exposed in the space 149 in FIG. 1 (see FIG. 1). A reference gas for measuring the NOx concentration is introduced through the entrance portion 48c into the atmosphere introduction layer 48. In this embodiment, the reference gas is the atmosphere (atmosphere in the space 149 in FIG. 1). The atmosphere introduction layer 48 is formed so as to cover the reference electrode 42. The atmosphere introduction layer 48 introduces the reference gas introduced through the entrance portion 48c into the reference electrode 42 while applying a predetermined diffusion resistance to the reference gas.

The reference electrode 42 is an electrode formed between the upper surface of the third substrate layer 3 and the first solid electrolyte layer 4. As described above, the atmosphere introduction layer 48 is provided around the reference electrode 42. The reference electrode 42 is formed directly on the upper surface of the third substrate layer 3, and the portion other than the portion in contact with the upper surface of the third substrate layer 3 is covered by the atmosphere introduction layer 48. As will be described later, the oxygen concentrations (oxygen partial pressures) in the first internal space 20, the second internal space 40, and the third internal space 61 can be measured using the reference electrode 42. The reference electrode 42 is formed as a porous cermet electrode (for example, a cermet electrode of Pt and $ZrO_2$) Although not particularly limited thereto, the length in the front-rear direction of the reference electrode 42 is, for example, 0.2 to 2 mm, the lateral width is, for example, 0.2 to 2.5 mm, and the thickness is, for example, 5 to 30 µm.

In the measurement-object gas flowing portion, the gas inlet 10 is a part open to the external space, and the measurement-object gas is taken from the external space through the gas inlet 10 into the sensor element 101. The first diffusion rate-determining portion 11 is a portion that applies a predetermined diffusion resistance to the measurement-object gas taken in through the gas inlet 10. The buffer space 12 is a space provided to guide the measurement-object gas introduced from the first diffusion rate-determining portion 11, to the second diffusion rate-determining portion 13. The second diffusion rate-determining portion 13 is a portion that applies a predetermined diffusion resistance to the measurement-object gas introduced from the buffer space 12 into the first internal space 20. When the measurement-object gas is introduced from the outside of the sensor element 101 into the first internal space 20, the measurement-object gas rapidly taken into the sensor element 101 through the gas inlet 10 by the pressure variation of the measurement-object gas in the external space (pulsation of the exhaust pressure when the measurement-object gas is exhaust gas of an automobile) is introduced into the first internal space 20 not directly but after the concentration variation of the measurement-object gas is canceled through the first diffusion rate determining portion 11, the buffer space 12, and the second diffusion rate determining portion 13. Consequently, the concentration variation of the measurement-object gas introduced into the first internal space 20 is reduced to a substantially negligible level. The first internal space 20 is provided as a space for regulating the oxygen partial pressure in the measurement-object gas introduced through the second diffusion rate-determining portion 13. The oxygen partial pressure is regulated by the operation of the main pump cell 21.

The main pump cell 21 is an electrochemical pump cell including an inner pump electrode 22 having a ceiling electrode portion 22a provided on almost the entire lower surface of the second solid electrolyte layer 6 facing the first internal space 20, an outer pump electrode 23 provided in a region corresponding to the ceiling electrode portion 22a on the upper surface of the second solid electrolyte layer 6 so as to be exposed to the external space (the sensor element chamber 133 in FIG. 1), and the second solid electrolyte layer 6 sandwiched between these electrodes.

The inner pump electrode 22 is formed across the upper and lower solid electrolyte layers (the second solid electrolyte layer 6 and the first solid electrolyte layer 4) defining the first internal space 20 and the spacer layer 5 forming the side wall. Specifically, the ceiling electrode portion 22a is formed on the lower surface of the second solid electrolyte layer 6 that forms the ceiling surface of the first internal space 20, a bottom electrode portion 22b is formed directly on the upper surface of the first solid electrolyte layer 4 that forms the bottom surface, side electrode portions (not shown) are formed on the side wall surfaces (inner surfaces) of the spacer layer 5 that form both side wall portions of the first internal space 20 so as to connect the ceiling electrode portion 22a and the bottom electrode portion 22b, and the inner pump electrode 22 is disposed in a structure having a tunnel shape at a portion where the side electrode portions are disposed.

The inner pump electrode 22 and the outer pump electrode 23 are formed as porous cermet electrodes (for example, cermet electrodes of Pt and $ZrO_2$ containing 1% of Au). The inner pump electrode 22 in contact with the measurement-object gas is formed of a material having a decreased reducing ability for the NOx component in the measurement-object gas.

In the main pump cell 21, oxygen in the first internal space 20 can be pumped out to the external space or oxygen in the external space can be pumped into the first internal space 20 by applying a desired pump voltage Vp0 between the inner pump electrode 22 and the outer pump electrode 23 to flow a pump current Ip0 in the positive direction or the negative direction between the inner pump electrode 22 and the outer pump electrode 23.

In order to detect the oxygen concentration (oxygen partial pressure) in the atmosphere in the first internal space 20, an electrochemical sensor cell, that is, a main pump-controlling oxygen partial pressure detection sensor cell 80 is formed by the inner pump electrode 22, the second solid electrolyte layer 6, the spacer layer 5, the first solid electrolyte layer 4, and the reference electrode 42.

The oxygen concentration (oxygen partial pressure) in the first internal space 20 can be determined by measuring an electromotive force V0 in the main pump-controlling oxygen partial pressure detection sensor cell 80. Further, the pump current Ip0 is controlled by feedback-controlling the pump voltage Vp0 of a variable power supply 25 such that the electromotive force V0 is constant. The oxygen concentration in the first internal space 20 can thereby be kept at a predetermined constant value.

The third diffusion rate-determining portion 30 is a portion that applies a predetermined diffusion resistance to the measurement-object gas whose oxygen concentration (oxygen partial pressure) is controlled by the operation of the main pump cell 21 in the first internal space 20, and guides the measurement-object gas to the second internal space 40.

The second internal space 40 is provided as a space in which, after the oxygen concentration (oxygen partial pressure) is regulated in advance in the first internal space 20, further regulation of the oxygen partial pressure by an auxiliary pump cell 50 is carried out with respect to the measurement-object gas introduced through the third diffusion rate-determining portion 30. The oxygen concentration in the second internal space 40 can thereby be kept constant with high accuracy, and therefore in the gas sensor 100, it is possible to measure the NOx concentration with high accuracy.

The auxiliary pump cell 50 is an auxiliary electrochemical pump cell including an auxiliary pump electrode 51 having a ceiling electrode portion 51a provided on substantially the entire lower surface of the second solid electrolyte layer 6 facing the second internal space 40, the outer pump electrode 23 (not limited to the outer pump electrode 23 but may be an appropriate electrode on the outside of the sensor element 101), and the second solid electrolyte layer 6.

The auxiliary pump electrode 51 is disposed in the second internal space 40, in a structure having a tunnel shape similar to the inner pump electrode 22 provided in the first internal space 20. In other words, the auxiliary pump electrode 51 has such a tunnel-shaped structure that the ceiling electrode portion 51a is formed on the second solid electrolyte layer 6 that forms the ceiling surface of the second internal space 40, a bottom electrode portion 51b is formed directly on the upper surface of the first solid electrolyte layer 4 that forms the bottom surface of the second internal space 40, and side electrode portions (not shown) connecting the ceiling electrode portion 51a and the bottom electrode portion 51b are formed on both wall surfaces of the spacer layer 5 that form side walls of the second internal space 40. As with the inner pump electrode 22, the auxiliary pump electrode 51 is also formed of a material having a decreased reducing ability for the NOx component in the measurement-object gas.

In the auxiliary pump cell 50, oxygen in the atmosphere in the second internal space 40 can be pumped out to the external space or oxygen can be pumped into the second internal space 40 from the external space by applying a desired voltage Vp1 between the auxiliary pump electrode 51 and the outer pump electrode 23.

In order to control the oxygen partial pressure in the atmosphere in the second internal space 40, an electrochemical sensor cell, that is, an auxiliary pump-controlling oxygen partial pressure detection sensor cell 81 is formed by the auxiliary pump electrode 51, the reference electrode 42, the second solid electrolyte layer 6, the spacer layer 5, and the first solid electrolyte layer 4.

The auxiliary pump cell 50 performs pumping at a variable power supply 52 whose voltage is controlled based on an electromotive force V1 detected by the auxiliary pump-controlling oxygen partial pressure detection sensor cell 81. The oxygen partial pressure in the atmosphere in the second internal space 40 is thereby controlled to a low partial pressure that does not substantially affect the measurement of NOx.

At the same time, the pump current Ip1 is used for controlling the electromotive force of the main pump-controlling oxygen partial pressure detection sensor cell 80. Specifically, the pump current Ip1 is input as a control signal into the main pump-controlling oxygen partial pressure detection sensor cell 80, its electromotive force V0 is controlled, and the slope of the oxygen partial pressure in the measurement-object gas introduced into the second internal space 40 from the third diffusion rate-determining portion 30 is thereby controlled to be constant at all times. When the gas sensor 100 is used as an NOx sensor, the oxygen concentration in the second internal space 40 is kept at a constant value of about 0.001 ppm by the operation of the main pump cell 21 and the auxiliary pump cell 50.

The fourth diffusion rate-determining portion 60 is a portion that applies a predetermined diffusion resistance to the measurement-object gas whose oxygen concentration (oxygen partial pressure) is controlled by the operation of the auxiliary pump cell 50 in the second internal space 40, and guides the measurement-object gas to the third internal space 61. The fourth diffusion rate-determining portion 60 serves to limit the amount of NOx flowing into the third internal space 61.

The third internal space 61 is provided as a space in which, after the oxygen concentration (oxygen partial pressure) is regulated in advance in the second internal space 40, a process related to the measurement of the concentration of nitrogen oxides (NOx) in the measurement-object gas is performed on the measurement-object gas introduced through the fourth diffusion rate-determining portion 60. Measurement of the NOx concentration is mainly performed in the third internal space 61 by the operation of the measurement pump cell 41.

The measurement pump cell 41 measures the concentration of NOx in the measurement-object gas in the third internal space 61. The measurement pump cell 41 is an electrochemical pump cell including a measurement electrode 44 provided directly on the upper surface of the first solid electrolyte layer 4 facing the third internal space 61, the outer pump electrode 23, the second solid electrolyte layer 6, the spacer layer 5, and the first solid electrolyte layer 4. The measurement electrode 44 is a porous cermet electrode. The measurement electrode 44 also functions as an NOx reducing catalyst to reduce NOx present in the atmosphere in the third internal space 61.

In the measurement pump cell 41, oxygen generated by the decomposition of nitrogen oxides in the atmosphere around the measurement electrode 44 can be pumped out, and the generated amount can be detected as a pump current Ip2.

In order to detect the oxygen partial pressure around the measurement electrode 44, an electrochemical sensor cell, that is, a measurement pump-controlling oxygen partial pressure detection sensor cell 82 is formed by the first solid electrolyte layer 4, the measurement electrode 44, and the reference electrode 42. A variable power supply 46 is controlled based on an electromotive force V2 detected by the measurement pump-controlling oxygen partial pressure detection sensor cell 82.

The measurement-object gas introduced into the second internal space 40 reaches the measurement electrode 44 of the third internal space 61 through the fourth diffusion rate-determining portion 60 under a condition where the oxygen partial pressure is controlled. The nitrogen oxide in the measurement-object gas around the measurement electrode 44 is reduced to generate oxygen ($2NO \rightarrow N_2+O_2$).

The generated oxygen is pumped by the measurement pump cell 41. At that time, a voltage Vp2 of the variable power supply 46 is controlled such that the electromotive force V2 detected by the measurement pump-controlling oxygen partial pressure detection sensor cell 82 is constant. Since the amount of oxygen generated around the measurement electrode 44 is proportional to the concentration of nitrogen oxides in the measurement-object gas, the concentration of nitrogen oxides in the measurement-object gas is calculated using the pump current Ip2 in the measurement pump cell 41.

An electrochemical sensor cell 83 is formed by the second solid electrolyte layer 6, the spacer layer 5, the first solid electrolyte layer 4, the third substrate layer 3, the outer pump electrode 23, and the reference electrode 42, and the oxygen partial pressure in the measurement-object gas outside the sensor can be detected by using an electromotive force Vref obtained by the sensor cell 83.

Further, an electrochemical reference gas regulation pump cell 90 is formed by the second solid electrolyte layer 6, the spacer layer 5, the first solid electrolyte layer 4, the third substrate layer 3, the outer pump electrode 23, and the reference electrode 42. The reference gas regulation pump cell 90 performs pumping when a control current (oxygen pumping current) Ip3 flows due to a control voltage Vp3 applied by a power supply circuit 92 connected between the outer pump electrode 23 and the reference electrode 42. The reference gas regulation pump cell 90 thereby pumps oxygen from the space around the outer pump electrode 23 (sensor element chamber 133 in FIG. 1) to around the reference electrode 42.

In the gas sensor 100 having such a configuration, by operating the main pump cell 21 and the auxiliary pump cell 50, measurement-object gas whose oxygen partial pressure is always maintained at a constant low value (a value substantially not affecting the NOx measurement) is given to the measurement pump cell 41. Accordingly, the NOx concentration in the measurement-object gas can be determined based on the pump current Ip2 that flows when the oxygen generated by the reduction of NOx is pumped out by the measurement pump cell 41 substantially in proportion to the concentration of NOx in the measurement-object gas.

Further, in order to enhance the oxygen ion conductivity of the solid electrolyte, the sensor element 101 is provided with a heater portion 70 serving as a temperature regulating device for heating the sensor element 101 to keep it warm. The heater portion 70 includes a heater connector electrode 71, a heater 72, a through hole 73, a heater insulating layer 74, a pressure release hole 75, and a lead wire 76.

The heater connector electrode 71 is an electrode formed in contact with the lower surface of the first substrate layer 1. By connecting the heater connector electrode 71 to an external power supply, power can be supplied to the heater portion 70 from the outside.

The heater 72 is an electric resistor formed so as to be sandwiched between the second substrate layer 2 and the third substrate layer 3 from above and below. The heater 72 is connected to the heater connector electrode 71 via the lead wire 76 and the through hole 73, and generates heat by being supplied with power from the outside through the heater connector electrode 71 to heat the solid electrolyte forming the sensor element 101 and keep it warm.

The heater 72 is embedded over the entire area from the first internal space 20 to the third internal space 61 and can regulate the entire sensor element 101 to a temperature at which the solid electrolyte is activated.

The heater insulating layer 74 is an insulating layer of porous alumina formed of an insulator, such as alumina, on the upper and lower surfaces of the heater 72. The heater insulating layer 74 is formed for the purpose of obtaining electrical insulation between the second substrate layer 2 and the heater 72 and electrical insulation between the third substrate layer 3 and the heater 72.

The pressure release hole 75 is a portion provided so as to penetrate through the third substrate layer 3 and the atmosphere introduction layer 48, and is formed for the purpose of relieving an increase in internal pressure accompanied with a temperature rise in the heater insulating layer 74.

Figure 3:
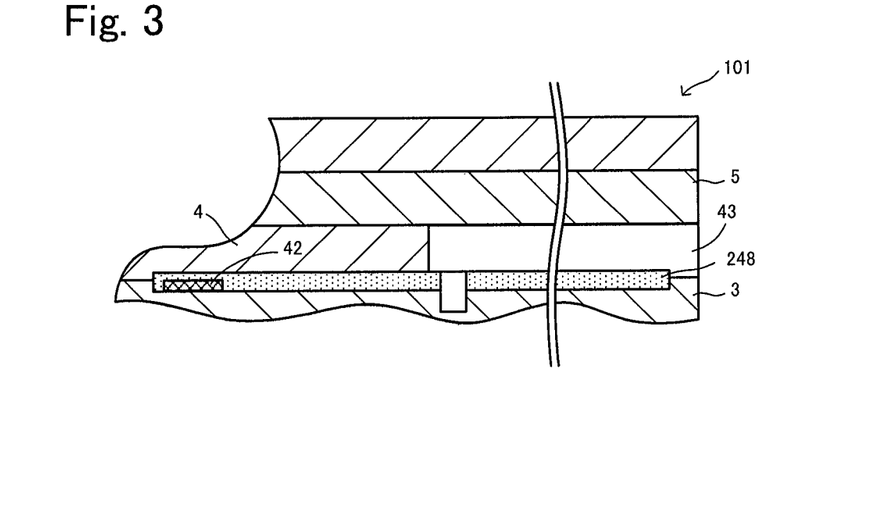
FIG. 3 is a schematic sectional view showing the configuration around an atmosphere introduction layer 248.
Figure 4:
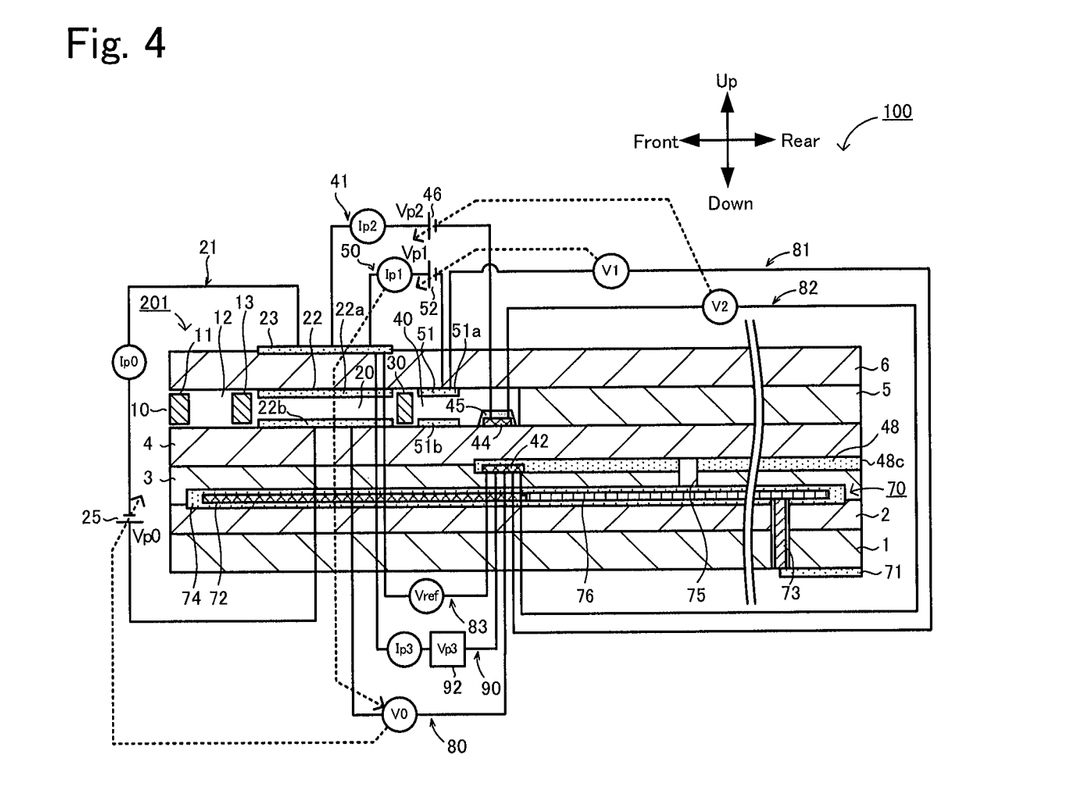
FIG. 4 is a schematic sectional view of a sensor element 201 according to a modified example.

The variable power supplies 25, 46, and 52 shown in FIG. 2 are actually connected to the respective electrodes via lead wires (not shown) formed in the sensor element 101 (only the reference electrode lead 47 described later is shown in FIGS. 3 and 4) and the connector 150 and the lead wire 155 in FIG. 1.

Next, an example of a method for manufacturing such a gas sensor 100 will be described below. First, six unfired ceramic green sheets containing an oxygen ion conductive solid electrolytes such as zirconia as a ceramic component are prepared. In these green sheets, a plurality of sheet holes used for positioning during printing and lamination, required through holes, and the like are formed in advance. A space serving as the measurement-object gas flowing portion is provided in advance in the green sheet to be the spacer layer 5 by a punching process or the like. Then, in correspondence with the first substrate layer 1, the second substrate layer 2, the third substrate layer 3, the first solid electrolyte layer 4, the spacer layer 5, and the second solid electrolyte layer 6, a pattern printing process and a drying process for forming various patterns in the ceramic green sheets are performed. Specifically, the patterns to be formed include, for example, the above-described respective electrodes, lead wires connected to the respective electrodes, the atmosphere introduction layer 48, the heater portion 70, and the like. The pattern printing is carried out by applying a pattern-forming paste prepared according to the characteristics required for each object on the green sheet using a known screen printing technique. The drying process is also carried out using a known drying device. After the pattern printing and drying are finished, printing and drying of the bonding paste for stacking and bonding the green sheets corresponding to the respective layers are performed. Then, the green sheets on which the bonding paste is formed are stacked in a predetermined order while being positioned by the sheet holes, and a pressure bonding process is performed by applying predetermined temperature and pressure conditions to perform pressure bonding to form one laminate. The laminate obtained in this way includes a plurality of sensor elements 101. The laminate is cut and cut into the size of the sensor element 101. Then, the cut laminate is fired at a predetermined firing temperature to obtain the sensor element 101.

After the sensor element 101 is obtained in this way, a sensor assembly 140 (see FIG. 1) incorporating the sensor element 101 is manufactured, and the protective cover 130, the rubber plug 157, and the like are attached to obtain the gas sensor 100. Such a manufacturing method of a gas sensor is known and is described in, for example, International Publication No. WO 2013/005491.

Here, the role played by the reference gas regulation pump cell 90 will be described in detail. The measurement-object gas is introduced from the sensor element chamber 133 shown in FIG. 1 to the measurement-object gas flowing portion, such as the gas inlet 10, of the sensor element 101. On the other hand, the reference gas (atmosphere) in the space 149 shown in FIG. 1 is introduced into the atmosphere introduction layer 48 of the sensor element 101. The sensor element chamber 133 and the space 149 are separated by the sensor assembly 140 (in particular, the green compacts 145a and 145b), and are sealed so that gases do not flow therebetween. However, when the pressure on the measurement-object gas side temporarily increases, for example, the measurement-object gas may slightly enter the space 149. If the oxygen concentration around the reference electrode 42 thereby temporarily decreases, the reference potential which is the potential of the reference electrode 42 changes. As a result, the electromotive force based on the reference electrode 42, such as the electromotive force V2 of the measurement pump-controlling oxygen partial pressure detection sensor cell 82, changes, and the detection accuracy of the NOx concentration in the measurement-object gas decreases. The reference gas regulation pump cell 90 serves to suppress such a deterioration in detection accuracy. The reference gas regulation pump cell 90 pumps oxygen from around the outer pump electrode 23 to around the reference electrode 42 by applying the control voltage Vp3 between the reference electrode 42 and the outer pump electrode 23 to flow the control current (oxygen pumping current) Ip3. Thus, when the measurement-object gas temporarily lowers the oxygen concentration around the reference electrode 42 as described above, it is possible to compensate for the decreased oxygen and to suppress the deterioration of the detection accuracy of the NOx concentration.

In this embodiment, when the average value of the control current (oxygen pumping current) Ip3 is P [μA], and the limiting current of the atmosphere introduction layer 48 when oxygen is pumped from around the reference electrode 42 to around the outer pump electrode 23 is Q [μA], the ratio Q/P is designed to be from 0.8 to 10. By setting the ratio Q/P to from 0.8 to 10, the oxygen concentration around the reference electrode 42 can be maintained at an appropriate value, and therefore the detection accuracy of the NOx concentration can be kept high.

The average value P of the control current (oxygen pumping current) Ip3 is as follows. That is, when a pulse voltage that is periodically turned on and off is applied as the control voltage Vp3 by the power supply circuit 92, a value obtained by multiplying the control current (oxygen pumping current) Ip3 flowing when the voltage is on by the duty ratio [%] is taken as the average value P. On the other hand, when a DC voltage is applied as the control voltage Vp by the power supply circuit 92, the control current (oxygen pumping current) Ip3 flowing during voltage application is taken as the average value P. The average value P of the oxygen pumping current has a correlation with the amount of oxygen pumped from around the outer pump electrode 23 to around the reference electrode 42, and the higher the average value P, the larger the amount of oxygen pumped. This average value P is not particularly limited, but is preferably from 1 to 30 [μA].

The method of measuring the limiting current Q of the atmosphere introduction layer 48 is as follows. First, the sensor element 101 is disposed in the atmosphere, and the heater 72 is energized to heat the sensor element 101 to a predetermined driving temperature (for example, 800° C.) The variable power supplies 25, 46, and 52 and the power supply circuit 92 are in a state in which no voltage is applied. After the temperature of the sensor element 101 is stabilized, the control voltage Vp3 is applied between the outer pump electrode 23 and the reference electrode 42 by the power supply circuit 92 so that oxygen is pumped from around the reference electrode 42 to around the outer pump electrode 23. At this time, the control current (oxygen pumping current) Ip3 flowing between the electrodes 23 and 42 is measured. The control voltage Vp3 is a direct current voltage. Thereafter, as the control voltage Vp3 is gradually increased, the control current (oxygen pumping current) Ip3 also gradually rises, but eventually, even if the control voltage Vp3 is raised, the control current (oxygen pumping current) Ip3 does not rise and reaches the upper limit. The upper limit at this time is referred to as limiting current Q. The flow rate of the atmosphere introduced through the entrance portion 48c of the atmosphere introduction layer 48 depends on the diffusion resistance of the atmosphere introduction layer 48. Therefore, the limiting current Q has a correlation with the diffusion resistance of the atmosphere introduction layer 48, and becomes smaller as the diffusion resistance becomes higher. The limiting current Q is not particularly limited, but is preferably from 5 to 30 [μA]. The limiting current Q can be regulated by changing the porosity of the porous material used for the atmosphere introduction layer 48, changing the length in the front-rear direction of the atmosphere introduction layer 48, or changing the cross-sectional area when the atmosphere introduction layer 48 is cut along a plane perpendicular to the front-rear direction.

If the average value P of the control current (oxygen pumping current) Ip3 is too large, there is a possibility that the amount of oxygen pumped is too large and the detected specific gas concentration becomes a value smaller than the actual value. Conversely, if the average value P is too small, there is a possibility that the amount of oxygen pumped is too small and the detected specific gas concentration becomes a value larger than the actual value. If the diffusion resistance of the atmosphere introduction layer 48 is high, oxygen pumped to around the reference electrode 42 may be excessively retained, and the oxygen concentration around the reference electrode 42 may become too high. Conversely, if the diffusion resistance of the atmosphere introduction layer 48 is low, the oxygen pumped to around the reference electrode 42 flows out to the outside without being sufficiently retained, and therefore it is difficult to maintain the oxygen concentration around the reference electrode 42 at an appropriate value. In this embodiment, since the ratio Q/P is set to from 0.8 to 10, it is possible to keep the balance between them.

Here, the correspondence relationship between the components of this embodiment and the components of the present invention will be clarified. The first substrate layer 1, the second substrate layer 2, the third substrate layer 3, the first solid electrolyte layer 4, the spacer layer 5, and the second solid electrolyte layer 6 of this embodiment correspond to the laminate of the present invention. The measurement electrode 44 corresponds to the measurement electrode, the outer pump electrode 23 corresponds to the measurement-object gas side electrode, the reference electrode 42 corresponds to the reference electrode, and the atmosphere introduction layer 48 corresponds to the reference gas introduction layer. The measurement pump cell 41 corresponds to the detecting device, and the reference gas regulation pump cell 90 corresponds to the reference gas regulating device.

According to the gas sensor 100 of this embodiment described in detail above, since the reference gas regulation pump cell 90 pumps oxygen to around the reference electrode 42, it is possible to compensate for the decrease in oxygen concentration around the reference electrode 42. By setting the ratio Q/P of the limiting current value Q of the atmosphere introduction layer 48 to the average value P of the control current (oxygen pumping current) Ip3 to from 0.8 to 10, the oxygen concentration around the reference electrode 42 can be maintained at an appropriate value, and therefore the detection accuracy of the NOx concentration can be kept high.

The average value P of the control current (oxygen pumping current) Ip3 is preferably from 1 to 30 µA. The limiting current value Q is preferably from 5 to 30 µA. This makes it easy to keep the detection accuracy of the NOx concentration high.

Furthermore, the porous atmosphere introduction layer 48 has an entrance portion 48c on the rear end face of the sensor element 101 on the side opposite to the front end face on which the gas inlet 10 is provided, and is provided from the entrance portion 48c to a position beyond the reference electrode 42. Therefore, for example, compared with a case where, as shown in FIG. 3, a cavity 43 is provided inwardly from the rear end face of the sensor element 101 and the upper surface of the porous atmosphere introduction layer 248 is exposed in the cavity 43, poisoning substances (contaminants) less easily enter the atmosphere introduction layer 48. The cavity 43 is formed in such a shape that the first solid electrolyte layer 4 sandwiched between the third substrate layer 3 and the spacer layer 5 is cut away from the rear end face side.

The present invention is not limited to the foregoing embodiments. It will be obvious that various modifications may be made within the technical scope of the present invention.

For example, in the above-described embodiment, the reference gas regulation pump cell 90 may flow a pulse current that is turned on and off at a predetermined period as the control current (oxygen pumping current) Ip3, between the reference electrode 42 and the outer pump electrode 23 and may pump oxygen to around the reference electrode 42, and the measurement pump cell 41 may detect the NOx gas concentration in the measurement-object gas during the period when the control current (oxygen pumping current) Ip3 is off. By doing so, since the control current (oxygen pumping current) Ip3 is turned off when detecting the NOx gas concentration in the measurement-object gas, it is possible to suppress the detection accuracy of the NOx concentration from being lowered by the control current (oxygen pumping current) Ip3. Even when the control current (oxygen pumping current) Ip3 is off, the current value does not necessarily become zero, for example, due to the capacitance between the reference electrode 42 and the outer pump electrode 23.

In the above-described embodiment, the atmosphere introduction layer 248 shown in FIG. 3 may be used instead of the atmosphere introduction layer 48. In this case, although poisoning substances easily enter as compared with the atmosphere introduction layer 48 as described above, the effect of keeping the detection accuracy of the NOx concentration high can be obtained by setting the ratio Q/P to from 0.8 to 10.

In the above-described embodiment, the sensor element 101 of the gas sensor 100 is provided with the first internal space 20, the second internal space 40, and the third internal space 61, but the present invention is not limited thereto. For example, as in the sensor element 201 in FIG. 4 described above, the third internal space 61 may not be provided. In the sensor element 201 of a modified example shown in FIG. 4, between the lower surface of the second solid electrolyte layer 6 and the upper surface of the first solid electrolyte layer 4, the gas inlet 10, the first diffusion rate-determining portion 11, the buffer space 12, the second diffusion rate-determining portion 13, the first internal space 20, the third diffusion rate-determining portion 30, and the second internal space 40 are adjacent to each other so as to communicate in this order. The measurement electrode 44 is disposed on the upper surface of the first solid electrolyte layer 4 in the second internal space 40. The measurement electrode 44 is covered by a fourth diffusion rate-determining portion 45. The fourth diffusion rate-determining portion 45 is a film formed of a ceramic porous body such as alumina ($Al_2O_3$). As with the fourth diffusion rate-determining portion 60 of the above-described embodiment, the fourth diffusion rate-determining portion 45 serves to limit the amount of NOx flowing into the measurement electrode 44. The fourth diffusion rate-determining portion 45 also functions as a protective film for the measurement electrode 44. The ceiling electrode portion 51a of the auxiliary pump electrode 51 is formed up to just above the measurement electrode 44. Even in the sensor element 201 having such a configuration, the NOx concentration can be detected by the measurement pump cell 41 as in the above-described embodiment.

In the above embodiment, the outer pump electrode 23 as the outer electrode of the measurement pump cell 41 also serves as the measurement-object gas side electrode of the reference gas regulation pump cell 90, but the present invention is not limited to this. The outer electrode of the measurement pump cell 41 and the measurement-object gas side electrode of the reference gas regulation pump cell 90 may be separately formed on the outer surface of the sensor element 101. As long as the measurement-object gas side electrode of the reference gas regulation pump cell 90 is disposed in a portion of the sensor element 101 that is exposed to the measurement-object gas, the arrangement position is not limited to the outer surface. For example, the measurement-object gas side electrode may be disposed in the measurement-object gas flowing portion.

In the above-described embodiment, the voltage Vp2 of the variable power supply 46 is controlled such that the control voltage (electromotive force) V2 detected by the measurement pump-controlling oxygen partial pressure detection sensor cell 82 is constant, and the nitrogen oxide concentration in the measurement-object gas is calculated using the pump current Ip2 at this time. However, the present invention is not limited to this as long as the specific concentration in the measurement-object gas is detected based on the voltage between the reference electrode 42 and the measurement electrode 44. For example, if an oxygen partial pressure detecting device is formed as an electrochemical sensor cell by combining the measurement electrode 44, the first solid electrolyte layer 4, the third substrate layer 3, and the reference electrode 42, it is possible to detect the electromotive force corresponding to the difference between the amount of oxygen generated by the reduction of the NOx component in the atmosphere around the measurement electrode 44 and the amount of oxygen contained in the reference gas, and the NOx component in the measurement-object gas can thereby be obtained. In this case, this electrochemical sensor cell corresponds to the detecting device of the present invention.

In the above-described embodiment, the reference electrode 42 is formed directly on the upper surface of the third substrate layer 3, but the present invention is not limited this. For example, the reference electrode 42 may be formed directly on the lower surface of the first solid electrolyte layer 4.

In the above-described embodiment, the reference gas is atmosphere, but it is not limited to this as long as it is a gas as a reference for detecting the concentration of the specific gas in the measurement-object gas. For example, a gas regulated to a predetermined oxygen concentration (>oxygen concentration of the measurement-object gas) in advance may be filled in the space 149 as a reference gas.

In the above-described embodiment, the sensor element 101 detects the NOx concentration in the measurement-object gas, but it is not limited to this as long as it detects the concentration of a specific gas in the measurement-object gas. For example, the concentration of oxygen in the measurement-object gas may be detected.

EXAMPLES

Hereinafter, examples in which gas sensors are specifically manufactured will be described as examples. The present invention is not limited to the following examples.

Experimental Example 1

The gas sensor 100 shown in FIGS. 1 and 2 was manufactured by the above-described manufacturing method and was referred to as Experimental example 1. In manufacturing the sensor element 101, the green sheets were formed by tape casting of a mixture of zirconia particles containing 4 mol % yttria as a stabilizing agent with an organic binder and an organic solvent. As the green compacts 145$a$ and 145$b$ in FIG. 1, talc powder was compacted. The limiting current Q of the atmosphere introduction layer 48 was measured beforehand in accordance with the above-mentioned measurement method and found to be 30 μA. The control voltage Vp3 applied by the power supply circuit 92 of the reference gas regulation pump cell 90 was a pulse voltage (duty ratio 60%) having a cycle T of 10 msec, an on time Ton of 6.0 msec, and an off time Toff of 4.0 msec. The control voltage Vp3 applied by the power supply circuit 92 was set such that the oxygen pumping current Ip3 flowing through the reference electrode 42 when the voltage is on is 30 μA. The average value of the oxygen pumping current Ip3 is 18 μA (=30 μA×60%).

Experimental Examples 2 to 26

In the same manner as in Experimental Example 1 except that the average value P of the control current (oxygen pumping current) Ip3, the limiting current Q of the atmosphere introduction layer 48, and the ratio Q/P were set to values shown in Table 1, gas sensors 100 were made and were referred to as Experimental examples 2 to 26.

[Evaluation of Detection Accuracy]

The gas sensor of Experimental example 1 was attached to a pipe. Then, the heater 72 was energized to set the temperature to 800° C., and the sensor element 101 was heated. In the power supply circuit 92, the control voltage Vp3 was the above-mentioned pulse voltage. In this state, a model gas having nitrogen as the base gas, an oxygen concentration of 10%, and an NOx concentration of 500 ppm was prepared and was flowed through the pipe as a measurement-object gas. This state was maintained for 20 minutes, and the electromotive force Vref during that period was measured. Measurements were also made in the same manner for Experimental examples 2 to 26.

As the oxygen concentration around the reference electrode 42 becomes higher than the oxygen concentration in the atmosphere, the electromotive force Vref tends to increase with the lapse of time from the value at the start of measurement. As the electromotive force Vref increases, the pump current Ip2 tends to become smaller than a real value (a value corresponding to an NOx concentration of 500 ppm). On the other hand, as the oxygen concentration around the reference electrode 42 becomes lower than the oxygen concentration of the atmosphere, the electromotive force Vref tends to decrease with the lapse of time from the value at the start of measurement. As the electromotive force Vref decreases, the pump current Ip2 tends to become larger than the real value.

Therefore, when the value of the electromotive force Vref at the start of the measurement was 100%, and the measured electromotive force Vref was within the predetermined range (no less than 80% and no more than 120%) even after 20 minutes elapsed, it was determined that the detection accuracy of NOx concentration was high ("A"). When the measured electromotive force Vref rose above the upper limit of the predetermined range before 20 minutes elapsed, it was determined that the detection accuracy of the NOx concentration was low ("B"). When the measured electromotive force Vref decreased below the lower limit of the predetermined range before 20 minutes elapsed, it was determined that the detection accuracy of the NOx concentration was low ("C").

The results of the above evaluation tests are shown in Table 1. As shown in Table 1, when the ratio Q/P was from 0.8 to 10, the evaluation was "A" and the detection accuracy of the NOx concentration was high (Experimental examples 1 and 10 to 23). On the other hand, when the ratio Q/P was 0.7 or less, the evaluation was "B" and the detection accuracy of the NOx concentration was low (Experimental examples 2 to 9). It is considered that this is because the oxygen concentration around the reference electrode 42 was too high compared to the atmosphere. When the ratio Q/P was 15 or more, the evaluation was "C" and the detection accuracy of the NOx concentration was low (Experimental examples 24 to 26). It is considered that this is because the oxygen concentration around the reference electrode 42 was too low compared to the atmosphere.

TABLE 1

| | Oxygen pumping current (when the voltage is on) [μA] | Duty ratio [%] | Average value P of oxygen pumping current [μA] | Limiting current Q of atmosphere introduction layer [μA] | Q/P | Evaluation |
|---|---|---|---|---|---|---|
| Experimental example 1 | 30 | 60 | 18 | 30 | 1.7 | A |
| Experimental example 2 | 300 | 50 | 150 | 20 | 0.1 | B |

TABLE 1-continued

| | Oxygen pumping current (when the voltage is on) [μA] | Duty ratio [%] | Average value P of oxygen pumping current [μA] | Limiting current Q of atmosphere introduction layer [μA] | Q/P | Evaluation |
|---|---|---|---|---|---|---|
| Experimental example 3 | 250 | 40 | 100 | 5 | 0.1 | B |
| Experimental example 4 | 200 | 30 | 60 | 10 | 0.2 | B |
| Experimental example 5 | 300 | 25 | 75 | 20 | 0.3 | B |
| Experimental example 6 | 150 | 50 | 75 | 20 | 0.3 | B |
| Experimental example 7 | 100 | 40 | 40 | 15 | 0.4 | B |
| Experimental example 8 | 100 | 80 | 80 | 30 | 0.4 | B |
| Experimental example 9 | 300 | 10 | 30 | 20 | 0.7 | B |
| Experimental example 10 | 130 | 20 | 26 | 20 | 0.8 | A |
| Experimental example 11 | 100 | 5 | 5 | 5 | 1.0 | A |
| Experimental example 12 | 100 | 20 | 20 | 20 | 1.0 | A |
| Experimental example 13 | 200 | 10 | 20 | 20 | 1.0 | A |
| Experimental example 14 | 50 | 30 | 15 | 30 | 2.0 | A |
| Experimental example 15 | 30 | 15 | 4.5 | 10 | 2.2 | A |
| Experimental example 16 | 200 | 4 | 8 | 20 | 2.5 | A |
| Experimental example 17 | 10 | 40 | 4 | 15 | 3.8 | A |
| Experimental example 18 | 50 | 10 | 5 | 20 | 4.0 | A |
| Experimental example 19 | 15 | 50 | 7.5 | 30 | 4.0 | A |
| Experimental example 20 | 20 | 20 | 4 | 20 | 5.0 | A |
| Experimental example 21 | 80 | 2 | 1.6 | 10 | 6.3 | A |
| Experimental example 22 | 250 | 1 | 2.5 | 20 | 8.0 | A |
| Experimental example 23 | 10 | 20 | 2 | 20 | 10.0 | A |
| Experimental example 24 | 10 | 10 | 1 | 15 | 15.0 | C |
| Experimental example 25 | 5 | 10 | 0.5 | 20 | 40.0 | C |
| Experimental example 26 | 15 | 5 | 0.75 | 30 | 40.0 | C |

Experimental examples 1 and 10 to 23 correspond to examples of the present invention, and Experiment examples 2 to 9 and 24 to 26 correspond to comparative examples.

The present application claims priority from Japanese Patent Application No. 2017-070703, filed on Mar. 31, 2017, the entire contents of which are incorporated herein by reference.

What is claimed is:

1. A method of operation of a gas sensor having a laminate having a plurality of laminated oxygen ion conductive solid electrolyte layers and having therein a measurement-object gas flowing portion for introducing and flowing a measurement-object gas, a measurement electrode disposed on an inner peripheral surface of the measurement-object gas flowing portion, a measurement-object gas side electrode disposed in a portion of the laminate that is exposed to the measurement-object gas, a reference electrode disposed in the laminate, a porous reference gas introduction layer for introducing a reference gas as a reference for detecting a specific gas concentration of the measurement-object gas and allowing the reference gas to flow to the reference electrode, a measurement pump cell that includes the measurement electrode, the measurement-object gas side electrode and at least a portion of the plurality of laminated oxygen ion conductive solid electrolyte layers, and a reference gas regulation pump cell that includes the reference electrode, the measurement-object gas side electrode and at least another portion of the plurality of laminated oxygen ion conductive solid electrolyte layers, the method comprising the steps of:
  detecting, by the measurement pump cell, the specific gas concentration of the measurement-object gas based on an electromotive force generated between the reference electrode and the measurement electrode;
  controlling flow of an oxygen pumping current between the reference electrode and the measurement-object gas side electrode and pumping oxygen from around the measurement-object gas side electrode to around the reference electrode;
  setting a limiting current value (Q) of the porous reference gas introduction layer; and
  based on the set limiting current value (Q) of the porous reference gas introduction layer, controlling an average value (P) of the oxygen pumping current such that a ratio Q/P is in a range of 0.8 to 10,
  wherein the limiting current value Q of the porous reference gas introduction layer is an upper limit of the oxygen pumping current that is reached as a control voltage applied between the measurement-object gas side electrode and the reference electrode is gradually increased.

2. The method according to claim 1, further comprising the step of controlling the average value (P) of the oxygen pumping current to be from 1 to 30 μA.

3. The method according to claim 1, further comprising the step of setting the limiting current value (Q) of the porous reference gas introduction layer to be from 5 to 30 μA.

4. The method according to claim 1, further comprising the steps of:
  controlling flow of, by the reference gas regulation pump cell, a current that is turned on and off at a predetermined period as the oxygen pumping current, between the reference electrode and the measurement-object gas side electrode, and pumping oxygen to around the reference electrode, and
  detecting, by the measurement pump cell, the specific gas concentration in the measurement-object gas in a period in which the oxygen pumping current is off.

* * * * *